(No Model.)

J. K. WOODWARD.
PROP.

No. 456,263. Patented July 21, 1891.

Witnesses:

Inventor
John K. Woodward.
By his Attorneys,
C. A. Snow & Co.

UNITED STATES PATENT OFFICE.

JOHN K. WOODWARD, OF RIVERSIDE, CALIFORNIA.

PROP.

SPECIFICATION forming part of Letters Patent No. 456,263, dated July 21, 1891.

Application filed December 24, 1890. Serial No. 375,713. (No model.)

*To all whom it may concern:*

Be it known that I, JOHN K. WOODWARD, a citizen of the United States, residing at Riverside, in the county of San Bernardino and State of California, have invented a new and useful Improvement in Props, of which the following is a specification.

This invention has relation to improvements in props for supporting the limbs of fruit and other trees.

The objects of the invention are to provide a cheap and simple supporting-bracket, one or a series of which is adapted to be mounted upon a suitable support or standard and located under a tree for the purpose of supporting one or several branches when the same are overburdened with fruit or foliage and liable to become broken by their own weight, storms, &c.

Other objects and advantages of the invention will appear in the following description, and the novel features thereof will be particularly pointed out in the claim.

Figure 1:
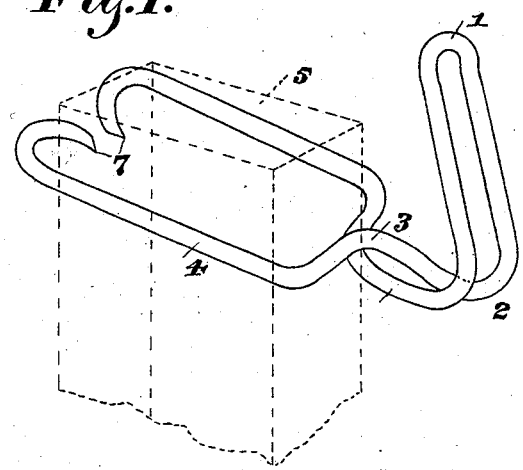
Figure 2:
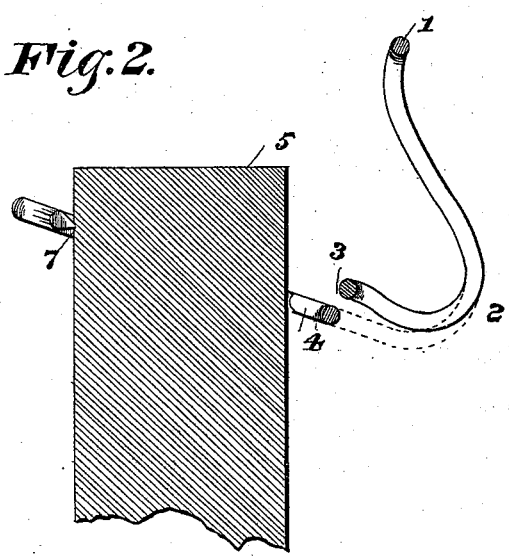

Referring to the drawings, Figure 1 is a perspective of a tree-prop constructed in accordance with my invention, the supporting-prop being dotted in position. Fig. 2 is a vertical longitudinal section of the prop and bracket.

Like numerals of reference indicate like parts in all the figures of the drawings.

In practicing my invention, for the purpose of economy I construct the bracket of wire, during the process of which I employ a wire blank of suitable length, and bend the same, as at 1, at its center to form opposite terminals, which lie parallel to each other for some distance and are similarly bent or curved to form the hook 2, after which said terminals cross each other, as at 3, and diverge to form a prop-embracing loop 4. The loop is sufficiently large to loosely embrace and freely slide upon the prop 5, and when released after being adjusted, the front end, being the heavier, falls slightly, and weight being applied to the hoop 2, which, it will be understood, receives the limb, the two rear spurs 7, in which the terminals of the loop 4 terminate, are thus drawn into the fiber of the prop, and any amount of weight applied to the hook will simply tend to more securely fasten the bracket in its adjusted position.

It will be observed that these brackets may be manufactured with facility and at an extremely small cost, and that they possess all the advantages of such brackets and may be readily slid up and down upon the top and when released will automatically secure themselves in their adjusted position. It will also be observed that one, two, or a series of brackets may be employed upon a single prop, and in this manner several limbs of a tree will be supported.

The bracket is formed of spring-wire and may be introduced laterally over the prop by spreading the terminals 4 wide enough to receive said prop.

Having described my invention, what I claim is—

The combination, with the prop 5, angular in cross-section, of the herein-described prop-bracket, the same formed of a single piece of wire doubled upon itself at its center and curved to form a rigid supporting-hook, beyond which the terminals are crossed at 3 and bent to form an angular loop 4, the ends of the terminals terminating in inwardly-bent sharp ends 7 at the rear end of the loop, which latter is of such size as to loosely embrace and slide upon the prop, substantially as specified.

In testimony that I claim the foregoing as my own I have hereto affixed my signature in presence of two witnesses.

JOHN K. WOODWARD.

Witnesses:
ANDREW JACKSON,
C. C. BIRDSALL.